United States Patent [19]

Jakubowski, Jr.

[11] 4,043,525

[45] Aug. 23, 1977

[54] VARIABLE ORIFICING DEVICE

[75] Inventor: Thaddeus Jakubowski, Jr., Long Beach, Calif.

[73] Assignee: McDonnell Douglas Corporation, Long Beach, Calif.

[21] Appl. No.: 672,526

[22] Filed: Mar. 31, 1976

[51] Int. Cl.[2] .............................................. B64D 1/12
[52] U.S. Cl. ................................ 244/137 R; 89/1.5 F; 137/625.5; 137/625.47
[58] Field of Search ...................... 244/118 R, 137 R; 89/1.5 F; 137/625.4, 625.5, 625.47, 625.41; 251/207

[56] References Cited

U.S. PATENT DOCUMENTS

| 2,934,090 | 4/1960 | Kenann et al. | 137/625.5 |
|---|---|---|---|
| 3,056,623 | 10/1962 | Herbert | 244/137 R |
| 3,115,896 | 12/1963 | Roberts et al. | 251/207 |
| 3,165,122 | 1/1965 | Sachnik | 137/625.47 |
| 3,180,358 | 4/1965 | Cogdell | 137/625.5 |
| 3,194,264 | 7/1965 | Greco | 137/625.5 |
| 3,800,830 | 4/1974 | Effer | 137/625.47 |
| 3,898,909 | 8/1975 | Craigie | 244/137 R |

FOREIGN PATENT DOCUMENTS

| 2,407,608 | 9/1974 | Germany | 244/137 R |
|---|---|---|---|
| 1,058,997 | 2/1967 | United Kingdom | 244/137 R |

*Primary Examiner*—Trygve M. Blix
*Assistant Examiner*—Galen L. Barefoot
*Attorney, Agent, or Firm*—G. W. Finch; W. J. Jason; D. L. Royer

[57] ABSTRACT

A store carrier for mounting a jettisonable store on a vehicle such as an aircraft and for releasing the store with ejective force applied at forward and aft locations by thrusters actuated by pressurized medium, the carrier including apparatus for adjustably apportioning the flow of medium to the thrusters by means of a double-acting metering device mounted between the source of medium and the thrusters.

8 Claims, 5 Drawing Figures

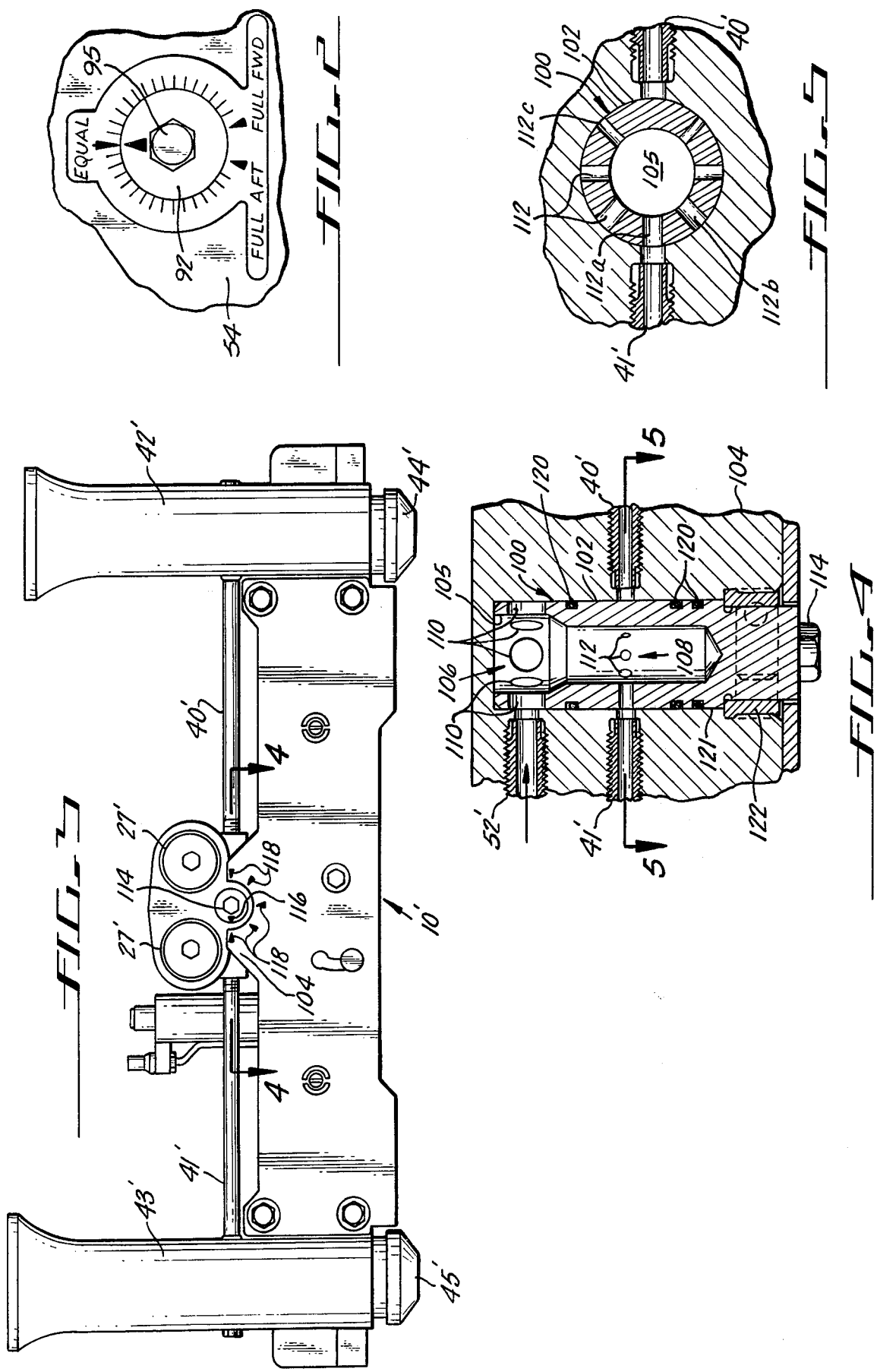

VARIABLE ORIFICING DEVICE

BACKGROUND OF THE INVENTION

This invention relates generally to store carriers for mounting a releasable store on an aircraft and, more particularly, to store carriers from which a store is released with ejective force applied at forward and aft locations by thrusters which are usually actuated by pressurized gas.

The store referred to herein may be used to contain munitions, or to contain other material to be dropped from an aircraft. In any event, when such a store is released from a high-speed aircraft, it is necessary that it be forcibly ejected away from the local field of air flow around the aircraft. Typically, ejection is effected by the use of explosive cartridges which are ignited as the store is released and which generate gas at sufficiently high pressure to force one or more pistons downwardly against the store for the desired forcible ejection. A store carrier of this general type, having forward and aft pistons for ejection of the store, is disclosed in U.S. Pat. No. 3,598,341, on an invention by Emmett T LaRoe, et al., entitled "Aircraft Store Carrier." In particular, FIG. 10 of the aforementioned patent and its accompanying description relate to a store carrier of the type referred to herein.

It has been found from experimentation and analysis that it is highly desirable to control the pitch of the store during its forcible ejection from the aircraft, both to ensure clean separation, and to improve accuracy in the desired point of impact of the store. The pitch imparted to the store on its release is determined largely by the rate at which gas is supplied to the thrusters or pistons at the forward and aft positions. Heretofore, this gas flow rate has been controlled by the use of fixed orifices installed in the store carrier during its assembly. These orifices are often selected to meet a worst-case condition of the store, but are usually less than optimum, and even detrimental to operations under other store or flight configurations. Ideally, the orifices should be selected on the basis of specific store and flight parameters, but this has not been practical, principally because replacement of the orifices is a very time-consuming operation, often requiring partial disassembly of the store carrier.

Some attempts have been made at pitch control by utilizing vents to bleed off the pressure from one piston or the other to provide the necessary differential ejection force. However, venting or bleeding of the gas supplied to the pistons inherently reduces the gas pressure and the total effective ejection force. Consequently, pitch can be controlled by this means only at the expense of introducing variations in other ejection parameters.

From the foregoing, it will be appreciated that there exists a need for an aircraft store carrier which includes a readily adjustable means for controlling the pitch of the store on its ejection from the aircraft. The present invention fulfills this need.

SUMMARY OF THE INVENTION

The present invention is directed to an aircraft store carrier of the same general type as described above, which includes means for adjustably apportioning the flow of a pressurized medium between the forward and/or aft thrusters without venting of the medium, and for thereby controlling the pitch imparted to the store on release from the aircraft. Accordingly, the store carrier of the present invention may be readily adjusted to suit prevailing store and flight conditions without disassembly of the carrier and without waste of ejection energy.

More specifically, the means for adjustably apportioning the flow of pressurized medium in the present invention include a housing enclosing a pressure chamber, the chamber having an inlet through which high pressure medium is introduced, and two outlets through which the medium passes to the forward and aft thruster pistons, respectively. A metering cylinder which can be rotated and which has discrete complementary orifices can be installed in the chamber so that the desired orifice meters the pressurized medium flow through the proper outlet to a selected thruster. Alternatively, an adjustable metering rod is positioned for sliding movement with respect to two orifices positioned at the outlets. Preferably, the rod is sized and tapered such that, when the rod moves from a central position, it tends to increase the flow through one orifice while simultaneously decreasing the flow through the other. One end of the metering rod can be attached to a threaded shaft which engages corresponding threaded portions of the housing to provide means for accurately adjusting the position of the rod by rotation of the shaft. An indicator may be attached to the shaft or cylinder to indicate the apportion setting. It will be apparent that in-flight adjustment of the metering rod or cylinder is also possible by the use of conventional servo devices mechanically linked thereto. This enables accommodation of unusual flight conditions which were unexpected prior to takeoff of the aircraft.

Other aspects and advantages of the invention will become apparent from the following, more detailed, description taken in conjunction with the accompanying drawings.

BRIEF DESCRIPTION OF THE DRAWINGS

FIG. 2 is a fragmentary, elevational view taken in the direction of the arrow 2 in FIG. 1;

FIG. 3 is a side view of a modified store carrier also embodying the present invention;

FIG. 4 is a fragmentary cross-sectional view of the flow apportioning means of the store carrier of FIG. 3 taken at line 4—4 thereof; and FIG. 5 is a fragmentary cross-sectional view of the flow apportioning means of FIGS. 3 and 4 taken at line 5—5 of FIG. 4.

DETAILED DESCRIPTION

Figure 1:
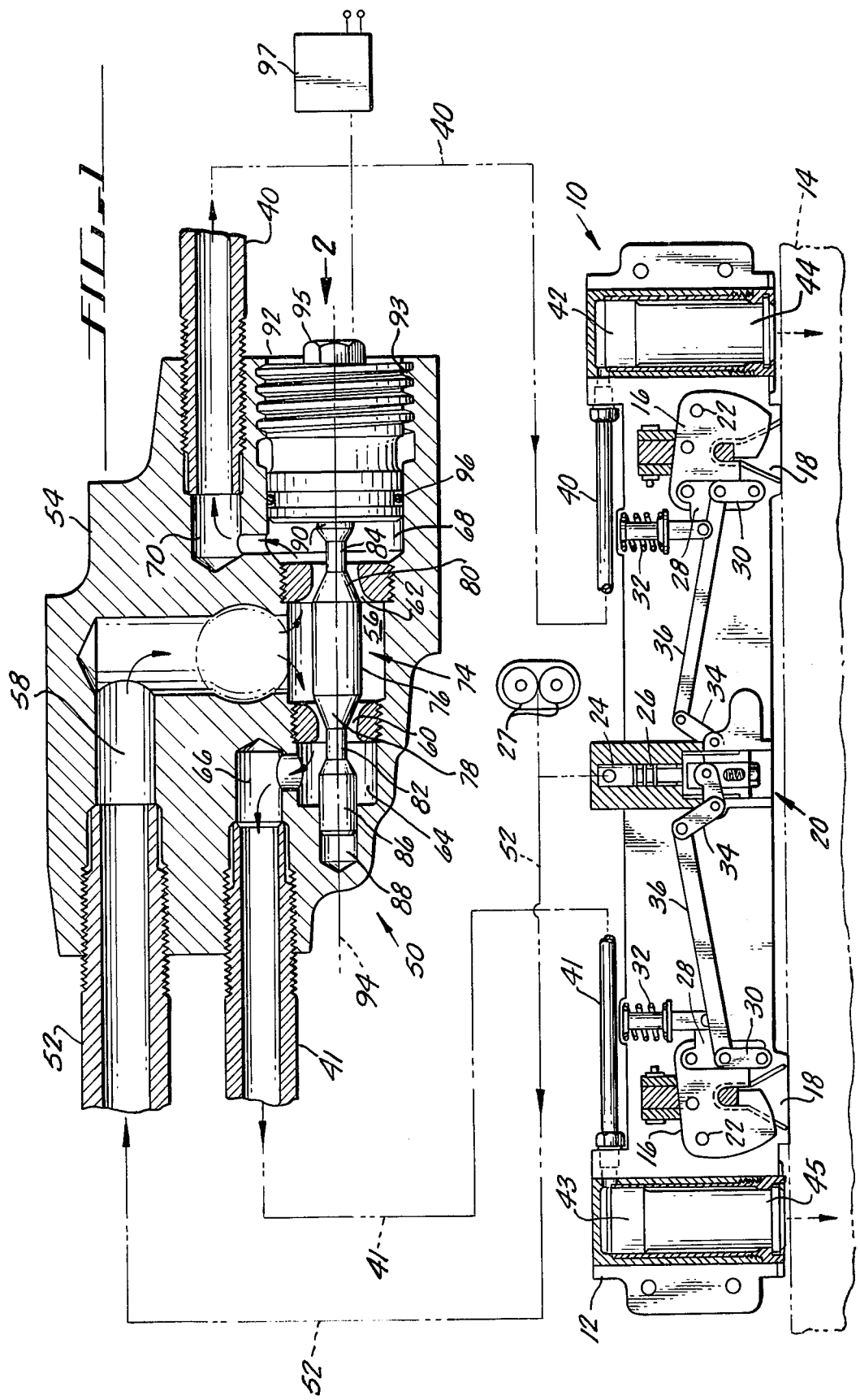
FIG. 1 is a fragmentary, partly sectional view of a store carrier embodying the present invention, with flow proportioning means in enlarged scale, and with the fluid line connections to the remainder of the store carrier shown diagrammatically.

As shown in the drawings for the purposes of illustration, the present invention is embodied in an improved aircraft store carrier, indicated by reference numeral 10, which is useful for mounting a jettisonable store on an aircraft, and for releasing the store with ejective force applied at forward and aft locations. As shown in the lower portion of FIG. 1, the store carrier 10 includes a carrier frame 12 adapted for mounting on an aircraft in such a position as to allow the carrier to support a store 14. The carrier 10 includes two suspension hooks 16 which engage corresponding lugs 18 on the store 14, and an actuating means 20 which is mechanically linked to the suspension hooks to rotate them about pivot pins 22, and thereby release the store.

Any suitable actuating means 20 and mechanical linkage may be used to release the store 14, but in the embodiment illustrated, the actuating means includes a vertically oriented cylinder 24 and piston 26, the piston being driven downwardly by expanding hot gases from one or more explosive cartridges 27 which are ignited when it is desired to release the store from the aircraft. Each of the suspension hooks 16 is held in a locked position by means of a toggle mechanism comprising a T-shaped link 28 and a straight link 30, acting in combination with a compression spring 32. As the piston 26 moves downwardly, two L-shaped bell cranks 34 are thereby rotated about central pivot points, and two release rods 36 are thereby moved inwardly toward the actuating mechanism 20, releasing the toggle mechanism 28 and 30, and allowing the suspension hooks 16 to rotate and disengage the lugs 18 of the store 14.

The expanding gases from the explosive cartridges 27 used to operate the actuating means 20 are also communicated by gas pipes 40 and 41 to forward and aft thruster cylinders 42 and 43 and utilized to actuate thruster pistons 44 and 45, moving them downwardly to forcibly eject the store 14 from the carrier 10. The foregoing portion of this detailed description relates to a store carrier of a type already known in the art, specifically a carrier as described in the aforementioned U.S. Pat. No. 3,598,341.

In accordance with the present invention, actuating gas is supplied to the forward and aft thruster cylinders 42 and 43 through an infinitely adjustable fluid flow apportioning device 50 which receives gas by means of line 52 from the explosive cartridges 27 and divides the flow as desired between the two lines 40 and 41 to the thruster cylinders 42 and 43. The flow apportioning device 50 is used to control the degree of pitch imparted to the store 14 without any waste in effective gas energy.

More specifically, the flow apportioning device 50 includes a housing 54 which encloses a pressure chamber 56 into which the gas from line 52 is introduced through a passage 58. Defining two exits from the chamber 56 are two orifices 60 and 62 which are axially aligned and located at opposite ends of the chamber 56. Gas passing through the orifice 60 reaches an exit chamber 64, which communicates it to the thruster cylinder 43 by means of a passage 66 and the pipe 41. Similarly, gas leaving the pressure chamber 56 through the orifice 62 reaches the thruster cylinder 42 by means of an exit chamber 68, another passage 70 and the other pipe 40.

Mounted coaxially with the orifices 60 and 62 is a metering rod 74. The rod 74 has a central portion 76 of relatively large diameter positioned in the pressure chamber 56, and two tapered portions 78 ad 80 which, in combination with the orifices 60 and 62 respectively, define the exit flow areas through the two orifices. Adjoining the tapered portions 78 and 80 are necked portions 82 and 84 respectively. The necked portion 82 adjoins an end portion of increased diameter 86 which is sized to slidingly engage a hole 88 in the housing 54, and the necked portion 84 adjoins an increased diameter end portion 90 which is affixed to a threaded shaft 92. The shaft 92 engages a threaded hole 93 in the housing 54 between the exterior of the housing 54 and the exit chamber 68.

Rotation of the shaft 92 results in linear translation of the metering rod 74 along the common axis 94 of the two orifices 60 and 62 and, accordingly, apportions the flow of gas received from line 52 to the outgoing lines 40 and 41. It will be apparent that, when the metering rod 74 is in a central position, there will be an equal division of gas flow to both of the thruster cylinders 42 and 43, resulting in an equal application of force to the forward and aft ends of the store 14. Rotation of the shaft 92 in either direction from the central position will provide an appropriate differential proportioning of the gas flow to the forward and aft thruster cylinders 42 and 43. Thus, the flow apportioning means are readily adjustable to control the pitch of the store 14 during its release and ejection from the aircraft.

The shaft 92 may include a hexagonal boss 95 at its outer end to permit adjustment of the angular position of the shaft, and the housing 54 surrounding the shaft may be calibrated as desired to indicate the corresponding ejection force provided by the various angular positions. An O-ring seal 96 is included around an unthreaded portion of the shaft 92, to prevent leakage of gas from the exit chamber 68. The shaft 92 may also be driven by an appropriate servo mechanism 97.

It will be appreciated that, when the rod 24 moves from its central position, the cross-sectional area of one of the orifices 60 and 62 is increased, while the corresponding area of the other orifice is simultaneously decreased. The invention therefore allows an infinite variation of orifice size from fully opened to fully closed through the rotation of the shaft 92. Moreover, the apportioning of gas flow to the forward and aft thruster cylinders 42 and 43 is achieved without wasting energy by venting or bleeing the pressurized gas.

It will be apparent that the invention lends itself to adaptation for use with various conventional servo systems to provide in-flight adjustment of the flow apportioning means 50 in response to selected flight parameters, such as the air speed, altitude or attitude of the aircraft.

A modified store carrier 10' is shown in FIG. 3 having forward and aft thruster pistons 44' and 45' which are driven by pressurized gas through pipes 40' and 41' which originates in single or dual explosive cartridges 27'. The device 10', however, includes an incrementally adjustable fluid flow apportioning device 100 as shown in FIGS. 4 and 5. The device 100 includes a cylinder 102 which is rotatable within a housing 104.

The cylinder 102 includes a concentric bore 105 and two sets of radially oriented ports 106 and 108 which enable gas flow into and out of the bore 105 respectively. The set of ports 106 is comprised of ports 110 which are of equal size and merely allow pressurized gas from the pipe 52' to flow into the bore 105. The gases flow out of the bore 105 through a selected pair of apportioning parts 112 whose relative sizes can be observed in FIG. 5. By rotating the cylinder 106 through the use of any suitable means such as hexagonal boss 114 so that indicator means 116 on the cylinder 102 are in alignment with the desired indicia 118 on the housing 104, the desired proportioning ports can be positioned adjacent the pipes 40' and 41'. In FIG. 5 the cylinder 102 has been turned so that a large port 112a will conduct gas into the pipe 41' whereas no port is present to conduct gases into pipe 40'. Therefore, all of the gas will go to the rearward thruster 43'. In the orientation of FIG. 5, it should be obvious that if the cylinder 102 is turned 45° clockwise, a larger-than-average port 112b will conduct gas into the pipe 41' whereas a smaller-than-normal port 112c will conduct gas into pipe 40'.

This would be the case when the use of both the forward and aft thrusters 42' and 43' is desired, however, it also is desired to have more force developed at the rearward thruster, 43', than at the forward thruster 42'. By turning the cylinder 102 to any of the five locations indicated by the indicia 118, it is possible to apportion incrementally the flow of pressurized gas between the forward and aft thrusters 42' and 43'.

Appropriate seals such as the O-rings 120 are provided between the cylinder 102 and the housing 104 to prevent gas flow along the interface 121. Also, suitable retainer means 122 are employed between the cylinder 102 and the housing 104 to retain the cylinder 102 within the housing 104.

Thus, there has been shown and described a novel store carrier having thrusters which are activated by a pressurized medium which is apportional by suitable incremental or infinitely variable flow apportioning means which fulfill all the objects and advantages sought therefor. Many changes, modifications, variations and other uses and applications of the subject invention will, however, become apparent to those skilled in the art after considering this specification together with the accompanying drawings. All such changes, modifications, variations and other uses and applications which should not depart from the spirit and scope of the invention are deemed to be covered by the invention which is limited only by the claims which follow.

What is claimed is:

1. A store carrier for mounting a jettisonable store on an aircraft, and for releasing the store with ejective force applied to the store at least at two different locations by medium actuated thrusters, wherein the improvement comprises:
    means for adjustably apportioning the flow of medium between said thrusters from a single location and thereby controlling the degree of pitch they impart to the store on ejection thereof from the aircraft, said means for adjustably apportioning the flow of medium including a housing enclosing a pressure chamber having at least one inlet for the introduction of medium, and an outlet for each thruster, each outlet being defined by an orifice of predetermined size, a metering rod located in part in said pressure chamber and having tapered portions located to cooperate with said orifices, and means for translating said metering rod linearly with respect to said orifices to vary the flow of medium through said orifices to said thrusters.

2. The store carrier as set forth in claim 1, wherein said means for translating said metering rod include:
    a threaded portion of said housing;
    a threaded shaft affixed to one end of said metering rod and engaging said threaded portion of said housing; and
    bearing means at the other end of said metering rod to support said rod for sliding movement caused by relative rotation between said threaded shaft and said threaded portion of said housing.

3. The store carrier as set forth in claim 2, wherein said means for translating said metering rod also include:
    a flow apportioning selector connected to cause relative rotation between said threaded shaft and said threaded portion of said housing when turned; and
    an indicator operatively connected to said flow apportioning selector to indicate the position of said metering rod with respect to said orifices.

4. The store carrier as set forth in claim 3 wherein said tapered portions of said metering rod are located so that when said metering rod is translated with respect to said orifices to increase the possible flow of medium through one of said orifices, the flow possible is simultaneously decreased through another.

5. The store carrier as set forth in claim 4 wherein two orifices and said metering rod are located coaxially.

6. A store carrier for mounting a jettisonable store on an aircraft and for releasing the store with ejective force applied to the store at least at two different locations by medium actuated thrusters, wherein the improvement comprises:
    a housing enclosing a pressure chamber having at least one inlet for the introduction of medium and an outlet for each thruster; and
    a member movable in said pressure chamber, said member having a plurality of orifices therein, said member orifices selectively cooperating with said outlets for the thrusters to selectively apportion the flow of medium thereto from a single location.

7. The store carrier as set forth in claim 6 wherein said member movable in said pressure chamber is a hollow cylinder, rotatable in said housing, said cylinder having at least one opening in communication with said inlet, said plurality of orifices being selected by rotating said cylinder with respect to said housing outlets.

8. The store carrier as set forth in claim 7 further including:
    a flow apportioning selector connected to said cylinder to enable rotation thereof; and
    an indicator operatively connected to said flow apportioning selector to indicate the position of said cylinder with respect to said housing.

* * * * *